US009427827B2

(12) United States Patent  (10) Patent No.: US 9,427,827 B2
Savolainen et al.  (45) Date of Patent: Aug. 30, 2016

(54) METHOD FOR MANUFACTURING A DOOR FRAME, WELDING ARRANGEMENT AND STRUCTURE OF A DOOR FRAME

(75) Inventors: Mikko Savolainen, Niinijoki (FI); Timo Tynkkynen, Loimaa (FI)

(73) Assignee: Pemamek Oy, Loimaa (FI)

( * ) Notice: Subject to any disclaimer, the term of this patent is extended or adjusted under 35 U.S.C. 154(b) by 1063 days.

(21) Appl. No.: 13/318,704

(22) PCT Filed: May 4, 2010

(86) PCT No.: PCT/FI2010/000030
§ 371 (c)(1),
(2), (4) Date: Jan. 17, 2012

(87) PCT Pub. No.: WO2010/128199
PCT Pub. Date: Nov. 11, 2010

(65) Prior Publication Data
US 2012/0102857 A1  May 3, 2012

(30) Foreign Application Priority Data

May 4, 2009 (FI) .................................... 20090176

(51) Int. Cl.
*B23K 28/02* (2014.01)
*B23K 37/02* (2006.01)
*E04H 12/00* (2006.01)

(52) U.S. Cl.
CPC ........... *B23K 28/02* (2013.01); *B23K 37/0229* (2013.01); *E04H 12/003* (2013.01)

(58) Field of Classification Search
CPC .... B25J 9/1697; E04G 23/02; E04H 12/003; B23K 26/032; B23K 9/026
USPC ...................................................... 174/45 R
See application file for complete search history.

(56) References Cited

U.S. PATENT DOCUMENTS 5,045,669 A * 9/1991 Ortiz, Jr. .............. B23K 26/032
219/121.61
5,868,355 A * 2/1999 Carter, Jr. .................. 244/129.5
(Continued)

FOREIGN PATENT DOCUMENTS

CN      1592818 A    3/2005
CN    101057074 A   10/2007
(Continued)

OTHER PUBLICATIONS

American Welding Society, "The Everyday Pocket Handbook on Welded Joint details for Structural Applications" Jan. 8, 2006, 32 pages.*
International Search Report issued in PCT/FI2010/000030.
Written Opinion of the International Searching Authority issued in PCT/FI2010/000030.

*Primary Examiner* — Jacob Cigna
(74) *Attorney, Agent, or Firm* — Kubovcik & Kubovcik

(57) ABSTRACT

Manufacturing method, welding arrangement and door frame structure for a door frame (21) of a windmill tower (10), wherein a hole (15) is made in the tower shell (10) for the door and a door frame is placed in the hole and welded on the shell. In the method, the shape of the door frame for the shell and the shape of the surface of the shell at the opening (15) to be made are measured with a measuring sensor (40). Based on the measurements, a cutting torch (41) is controlled so that an opening corresponding to the shape of the door frame is cut in the shell and bevels (16, 17) are cut in the edge of the opening on both sides. The door frame is welded on the shell with a weld (24), such as a double bevel, double J or square butt weld, from the inside and the outside of the shell.

2 Claims, 7 Drawing Sheets

(56) References Cited

U.S. PATENT DOCUMENTS

| | | | |
|---|---|---|---|
| 7,034,249 B2 * | 4/2006 | Gustafsson | B23K 9/0026 219/124.34 |
| 2005/0021170 A1 * | 1/2005 | Gustafsson | B23K 9/0026 700/186 |
| 2005/0166414 A1 | 8/2005 | Lum et al. | 33/550 |
| 2006/0185874 A1 * | 8/2006 | Bowman et al. | 174/45 R |
| 2007/0148004 A1 * | 6/2007 | Wernicke et al. | 416/244 R |
| 2011/0219711 A1 * | 9/2011 | Bagepalli et al. | 52/204.1 |
| 2011/0258952 A1 * | 10/2011 | Amdaa et al. | 52/302.1 |
| 2011/0265402 A1 * | 11/2011 | Pfleger | 52/213 |

FOREIGN PATENT DOCUMENTS

| | | |
|---|---|---|
| DE | 3504840 A1 * | 8/1986 |
| DE | 10 2006 017 629 A1 | 8/2007 |
| DE | 10 2007 059 505 A1 | 10/2008 |
| DE | 102008035350 A1 * | 2/2010 |
| EP | 1 314 510 A1 | 5/2003 |
| WO | 2006-050723 A1 | 5/2006 |
| WO | WO 2006050723 A1 * | 5/2006 |

\* cited by examiner

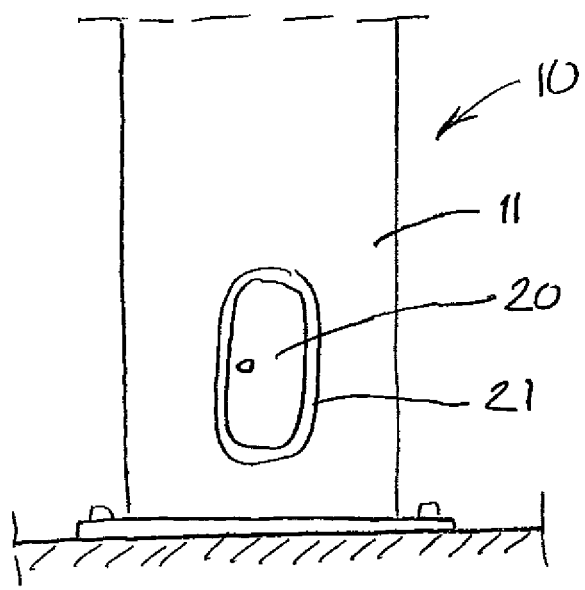
FIG. 1
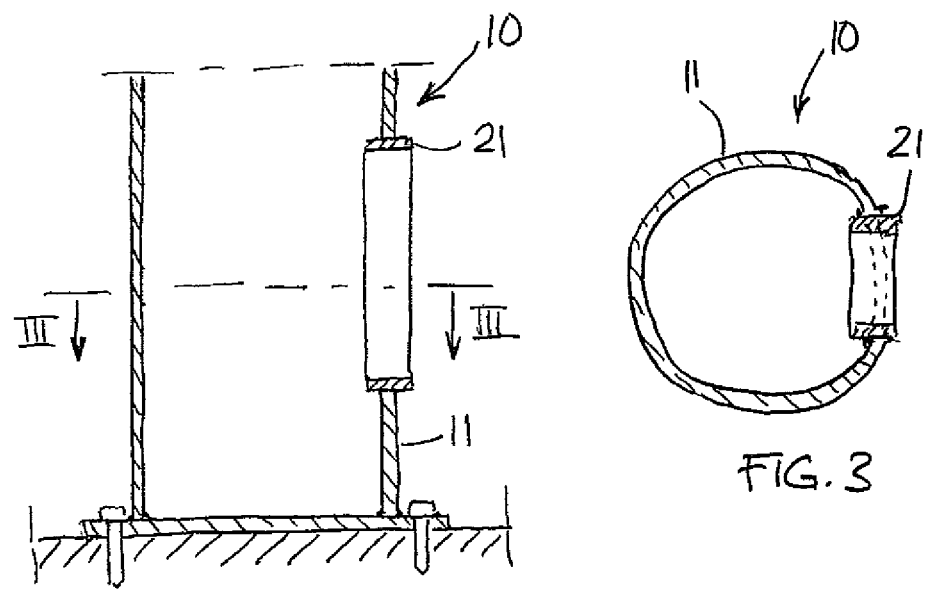
FIG. 2
FIG. 3

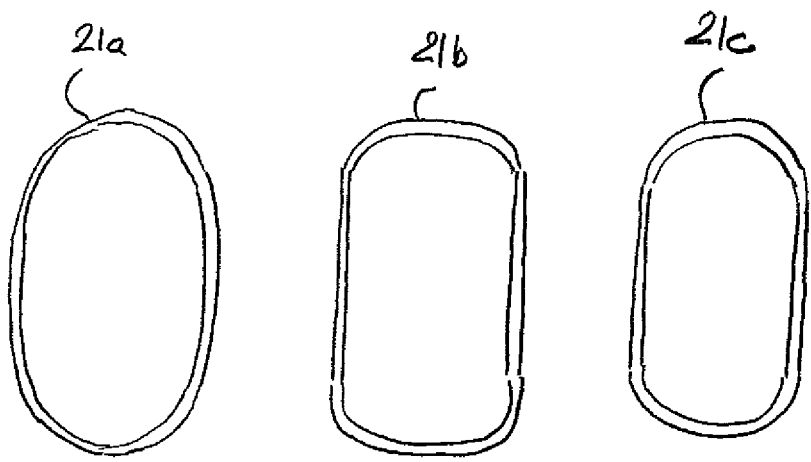
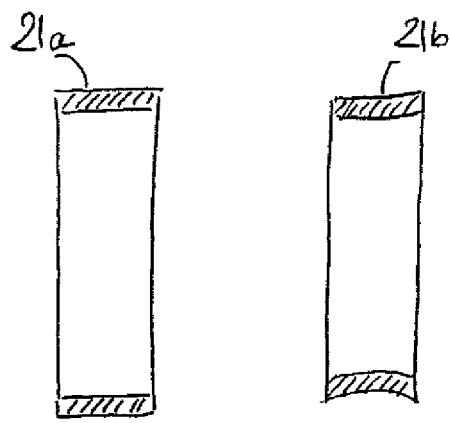
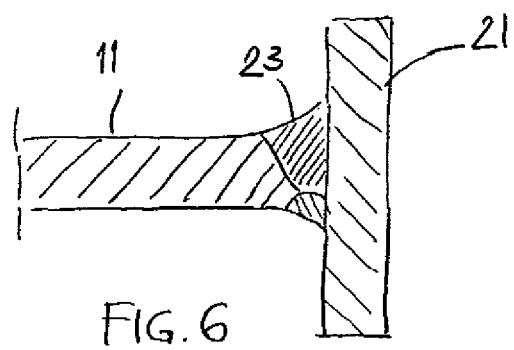

METHOD FOR MANUFACTURING A DOOR FRAME, WELDING ARRANGEMENT AND STRUCTURE OF A DOOR FRAME

OBJECT OF THE INVENTION

The object of the invention is a door frame manufacturing method wherein an opening is made for the door in a tubular shell, such as a windmill tower, and a door frame is placed in the opening and welded on the shell. The object of the invention is furthermore a welding arrangement for the door frame and a door frame structure.

PRIOR ART

According to a known method, an access door is made in the lower part of each windmill tower. Because the structure of the windmill tower is subjected to a substantial fatigue-inducing load reversal, the access door opening must be reinforced. Also the joint between the door frame and the tower must be extremely strong, and each joint must be inspected using non-destructive tests (NDT).

In a known manufacturing method of windmills, the tower is generally arranged in the form of a large, slightly conical tube with thick material in the shell. Precise manufacturing of this type of tube is nearly impossible or at least unnecessarily expensive. The large size of the tower also makes working difficult and creates problems in work safety and parts handling. When an opening is formed in the shell, the stresses built in during the manufacturing of the shell are released, causing a new deformation in the shape of the shell. In such a case, the openings formed in the shell are always different.

A door frame formed in a windmill tower is a frame that has either been cut from thick metal sheet or folded from metal sheet. The frame, seen from the front, can have, for example, an elliptic shape or parallel-edged sides with elliptic or semicircular ends. The shape of the frame is always inaccurate because manufacturing from thick material is difficult, causing deformation. The aim is to achieve a rectangular cross section of the frame, but due to the manufacturing inaccuracy in the cross section, its sides can also be arched. Thus each frame has an individual shape.

As both the tower shell opening and the door frame are individual and inaccurate, air gaps of varying sizes are formed between the opening and the door frame when fitting the door frame in the opening of the tubular tower and the joint fit becomes unnecessarily inaccurate. Due to the inaccuracies, the air gap can be quite large, making welding operations difficult when welding the door frame on the tower shell. In such a case, the root of the joint cannot be welded with high enough quality, making back gouging necessary, for example by using a carbon gouge or by grinding, which is a laborious and noisy operation. In such a case, unnecessarily large volumes must be filled in by welding due to the inaccurate fit and large gaps. As the resulting consumption of weld metal is high, it is all the more likely that a welding error will occur, in which case the manufacturing of the door frame with weld repairs takes a long time. As a result of the above-mentioned problems, the manufacturing of a windmill tower lacks smoothness, meaning that the manufacturing process is slow, takes up a lot of extra floor space and requires unnecessary handling of parts.

In the known method of windmill manufacturing, the door frame installation operations are performed inside the tube so that the welder enters the tube which has been placed in a horizontal position for the manufacturing, marks the shape of the opening inside the tube on its bottom surface using a template of a standard size. In these circumstances, deformations in the frame or in the tube cannot be taken into consideration. Then the welder cuts a hole and makes a bevel in the edge of the opening manually by torch-cutting. The bevel is thereby only cut on one of the surfaces of the tower shell, i.e. on the inner surface of the tube, forming a half-V groove that opens up towards the inside of the tube. After that, the door frame is lifted manually onto the opening, a ceramic backing is placed below the joint outside the tube and the welder closes the single V groove between the frame and the tower frame by welding. During the cutting of the shell opening, torch-cutting of the bevel and welding of the single V groove, the welder works inside the tower tube, thus being exposed to welding fumes. After the welding, back gouging is performed on the opposite side, i.e. outside the tower shell, for example by carbon arc gouging, and the root is closed by welding.

The advantage of welding into a single V groove is that the work can be done almost entirely inside the tube, which eliminates the need for scaffolding. On the other hand, the drawback is that when working in an almost closed space, the extraction of welding fumes may become a problem. However, the single V groove used in this method is not very advantageous because the weld volume of the bevel is double compared to that of a double bevel groove, for example. In a single V groove, the interface between the weld and the base material must also be ground thoroughly to achieve as good a joint as possible.

PURPOSE OF THE INVENTION

The purpose of this invention is to provide a door frame manufacturing method which eliminates the above-mentioned drawbacks. Another purpose of the invention is to provide a new door frame manufacturing method which is more accurate and faster and which can be automated. The purpose of the invention is also to provide a new door frame welding arrangement and door frame structure which is attached to the windmill tower shell in a more advantageous and reliable way.

Characteristics of the Method According to the Invention

The door frame manufacturing method according to the invention is characterised in
that the shape of the door frame for the tubular shell and the shape of the surface of the tubular shell at the opening to be made in the shell are measured with a measuring sensor, and
that a cutting device is controlled, based on the measurements, so that an opening corresponding to the shape of the door frame is cut in the shell with the cutting device, such as a cutting torch.

Embodiments of the Method According to the Invention

A preferred embodiment of the method according to the invention is characterised in that a cutting device is controlled based on measurements carried out with a measuring sensor to make a bevel in the edge of the cut-out opening.

Another preferred embodiment of the method according to the invention is characterised in that the bevels are made in the edge of the cut-out opening on both sides of the opening.

A third preferred embodiment of the method according to the invention is characterised in that the door frame is welded on the tubular shell with a double bevel weld, asymmetric double V butt weld, double J weld or square butt weld on the inside and the outside of the shell.

A fourth preferred embodiment of the method according to the invention is characterised in that the measurement data of a 3D measuring sensor is utilised for the real time monitoring and control of the welding process.

Welding Arrangement According to the Invention

The object of the invention is also a welding arrangement for a door frame of a tubular shell, such as a windmill tower.

Characteristics of the Welding Arrangement According to the Invention

The door frame welding arrangement according to the invention is characterised in that the welding arrangement comprises a measuring sensor for measuring the shape of the door frame and the shape of the surface of the tubular shell, a computer system for determining the cutting path for the shell opening and the welding path between the door frame and the shell.

Embodiments of the Welding Arrangement According to the Invention

A preferred embodiment of the door frame welding arrangement according to the invention is characterised in that the welding arrangement comprises a computer system to determine the bevel angle of the shell opening so that in the weld between the shell and the door frame, such as a double bevel, double J or square butt weld, the amount of filler metal is essentially constant.

Another preferred embodiment of the door frame welding arrangement according to the invention is characterised in that a welding device connected to a robot is used for welding together with a 3D measuring sensor connected to a robot so that the measurement data from the measuring sensor can be utilised in real-time monitoring and control of the welding process.

Device According to the Invention

The object of the invention is also a door frame structure for a tubular shell, such as a windmill tower.

Characteristics of the Device According to the Invention

The door frame structure according to the invention is characterised in that in the weld between the shell and door frame, the angle of the groove bevel has been adjusted based both on the shape of the door frame and the shape of the surface of the tubular tower shell.

Embodiments of the Device According to the Invention

A preferred embodiment of the device according to the invention is characterised in that in the weld between the tubular shell and the door frame, such as a double bevel, double J or square butt weld, the angle of the groove bevel has been adjusted so that the amount of filler metal is essentially constant.

Examples of Embodiments

In the following, the invention is described using examples with reference to the appended drawings, in which

LIST OF FIGURES

FIG. 1 shows a side view of the lower part of the windmill tower.

FIG. 2 shows a vertical sectional view of the lower part of the windmill tower of FIG. 1.

FIG. 3 shows a cross-sectional view of the lower part of the windmill tower of FIG. 1.

FIGS. 4a-4c show side views of various shapes of the door frame.

FIGS. 5a-5b show cross-sectional shapes of the door frame.

FIG. 6 shows a sectional view of a single V butt weld used in a known method.

FIG. 7 shows a top view of the door frame measuring operation.

FIG. 8 shows a side view of a horizontal windmill tower shell measuring operation in the manufacturing phase.

FIG. 9 shows the cutting of a door opening from the inside in a windmill tower shell.

FIG. 10 shows the bevelling of the edge of the door opening from the outside in the windmill tower shell.

FIG. 11 shows the lifting of the door frame in its place in the opening of the tubular shell of a windmill tower.

FIG. 12 shows the tack welding of the door frame on the tubular shell of the tower.

FIG. 13 shows the first step of welding the door frame on the tubular shell of the tower from the inside.

FIG. 14 shows the second step of welding the door frame on the windmill tower shell from the outside.

FIG. 15 shows a sectional view of the double bevel weld of the door frame.

DESCRIPTION OF THE FIGURES

FIG. 1 shows the lower part of a windmill tower 10, the tubular shell 11 of which is provided with an access door 20. The access door 20 comprises a door frame 21, which has been welded in the opening made in the tubular shell 11 of the windmill tower 10.

FIG. 2 shows a vertical sectional view of the lower part of the windmill tower 10, showing that the door frame 21 has been welded in the opening formed in the side of the shell 11 of the tower 10.

FIG. 3 shows a cross-sectional view of the lower part of the windmill tower 10, which also shows the door frame 21 welded in the opening made in the shell 11 of the tower 10.

FIGS. 4a-4c show side views of various shapes 21a-21c of the door frame 21.

FIGS. 5a-5b show cross-sectional shapes of the door frame 21. In FIG. 5a, the cross-section is rectangular in shape. This minimises deformations due to the cross section. In FIG. 5b, the cross section of the door frame 21 is arched. In this situation, the cross section also causes marked deformation.

FIG. 6 shows a sectional view of a single V butt weld 23 according to a known method, having a large bevel weld volume. In the method, back gouging must be performed because the root cannot be welded with high enough quality.

FIG. 7 also shows an industrial robot 30, which moves on tracks perpendicular to the longitudinal axis of the windmill tower 10, the arm 32 of which robot can be moved vertically in the guide rails 33. A measuring sensor 40 connected to the end of the arm 32 of the robot 30 is moved by the robot 30 so that the measuring sensor 40 follows the outer circumference of the door frame 21 during the measuring of the door frame 21. In this way it is possible to measure, with the robot 30 and the measuring sensor 40, both the shape of the circumference of the door frame 21 and the cross-sectional error of the door frame 21 along the entire circumference.

The measuring sensor 40 connected to the arm 32 of the robot 30 can be a sensor which enables the measurement of the shape of the surface of an object in 3D space. In such a case, it can be a sensor which measures the surface profile in 2D space and the third dimension is obtained by moving the sensor along the door frame 21 with the robot 30.

Figure 7:
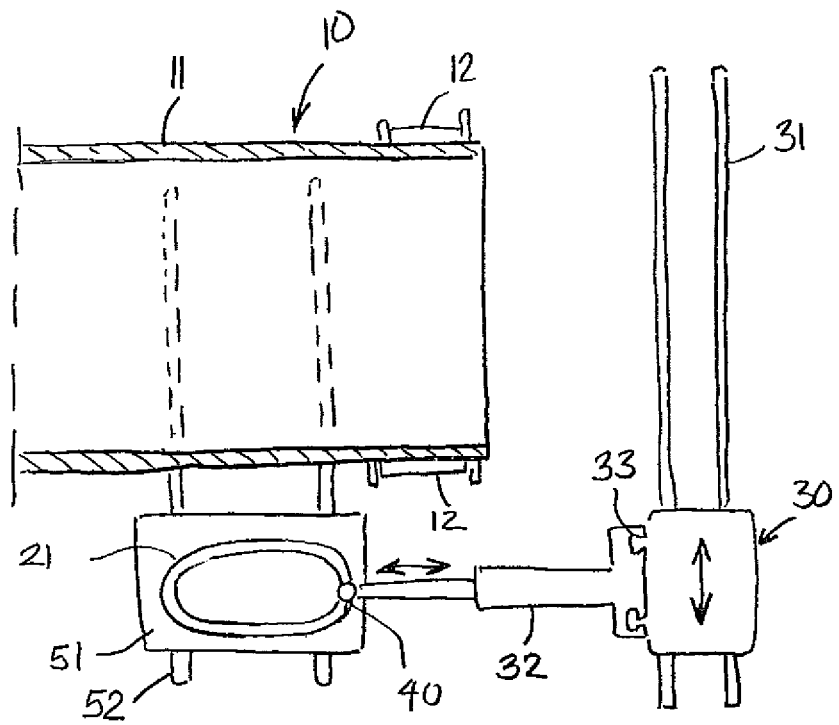
FIG. 7 shows the door frame 21 of the windmill tower 10, the door frame being placed next to the shell tube 11 of the tower 10 on the working platform 51 of a scissor lift for measuring. The scissor lift has been placed on a path 52 perpendicular to the longitudinal axis of the windmill tower 10, so that the scissor lift and the door frame 21 on its working platform 51 can be moved under the shell 11 of the tower 10, as described below.
Figure 8:
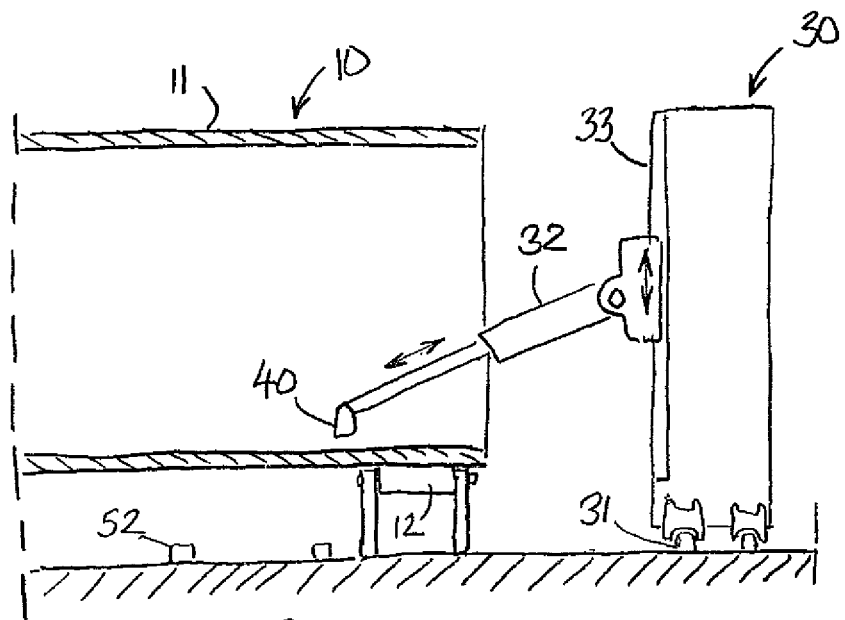

FIG. 8 shows a device arrangement corresponding to FIG. 7, but in this situation the industrial robot 30 is used to measure the surface of the tubular shell 11 of the windmill tower 10 placed on rotating rollers 12. The rotating rollers 12 can form a set of rotating rollers which operates under the control of the robot 30 and which has been designed according to the dimensions of the tower 10.

In the embodiment shown in FIG. 8, the robot 30 is used to measure the inner side of the tubular shell 11 of the windmill tower 10, in which case it is also advantageous to make the opening 15 from the inside of the shell 11. Alternatively, the robot 30 can, however, also be used to measure the outer surface of the tubular shell 11 of the windmill tower 10, in which case it is also advantageous to make the opening 15 from the outside of the shell 11. According to an embodiment of the invention, the opening 15 is, however, made from the opposite side of the shell 11 compared to the measurement of the shape of its surface. This is possible because, after the measurement of the shape of the surface, it is possible to determine the shape of the surface of the opposite side by taking into consideration the thickness of the shell 11.

In FIG. 8, the measuring sensor 40 connected to the end of the arm 32 of the robot 30 has been brought inside the tubular shell 11 of the windmill tower 10, which lies in a horizontal position during manufacturing and the robot 30 performs the measuring cycle on the door frame for the shell 11 by following the inner surface of the shell 11.

The path to be measured is calculated and the robot movement path programme is created automatically in a computer application based on the measurement of the door frame 21 shown in FIG. 7. The computer application also calculates the cutting path for the opening based on the measurements carried out in FIGS. 7 and 8. Experience-based information is used to determine the deformation of the shell 11 of the tower 10 when cutting the opening for the door frame. The cutting angles are selected so that the volume of the groove to be welded is of the desired size:

The amount of filler metal needed is minimised so that the groove angle is as small as possible at all points. The deposition of filler metal must be adjusted to suit the various spots so that the joint can be filled with a constant number of welding layers.

A constant amount of filler metal is achieved by adjusting the groove angle so that a lower joint has a shallower bevel angle, in which case the joint can be welded so that the deposition of filler metal remains constant. The welding process needs to be adjusted in any case along the entire weld, because the welding position changes all the time due to the saddle surface of the area to be welded, resulting from the arched shape of the tubular shell.

Figure 9:
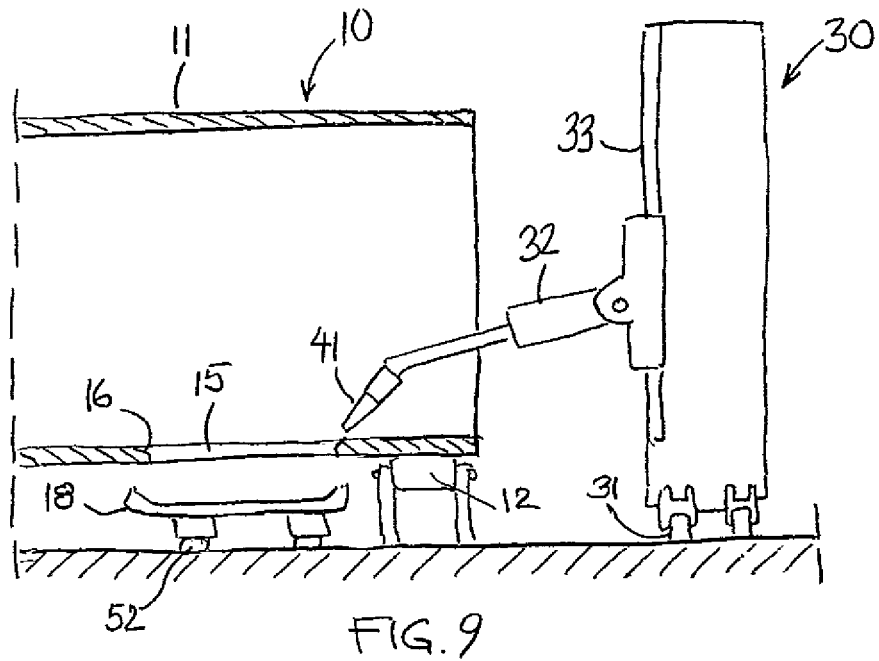

FIG. 9 shows the making of the opening 15 for the door frame 21 in the tubular shell 11 of the windmill tower 10. Before making the opening 15, a combined extraction table and grate 18, moving on tracks 52 perpendicular to the longitudinal axis of the windmill tower 10, is brought to the cutting area under the shell 11 to extract welding fumes and the scrap metal produced when cutting the opening 15.

In the embodiment shown in FIG. 9, the opening 15 is cut, in several steps, from the inside using a cutting device 41, such as a plasma torch, connected to the end of the arm 32 of the robot 30. In this case, a roughing cut is made first from the inside of the shell 11, thereby releasing the stresses of the shell 11, after which a control measurement and the calculation of the final cutting path are carried out. After that, an opening cut is made along the root face of the weld to be made and finally a bevel 16 is made in the edge of the opening 15, which opens up on the inside of the shell. The bevel 17 of the edge of the opening 15, which opens up on the outside of the shell 11, can also be made at this stage from inside the shell 11, but in the embodiment shown, it is made from the outside. After cutting the opening 15 and making the bevel 16 that opens up on the inside of the shell 11, the welding fume extraction table and scrap removal grate 18 are driven, along the tracks 52, to the side of the shell 11 of the tower 10 and loose scrap metal is removed.

Figure 10:
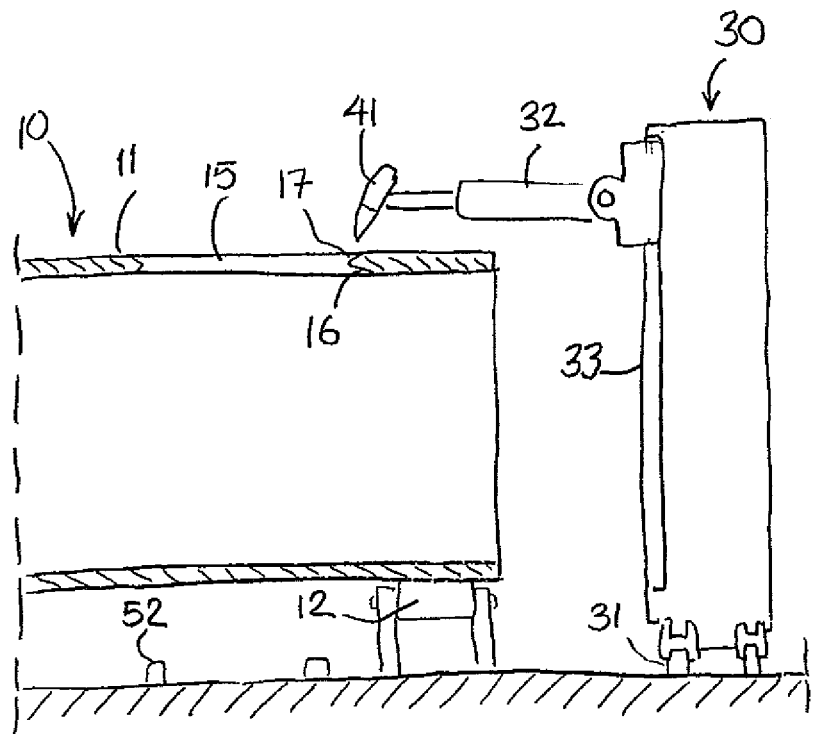
Figure 11:
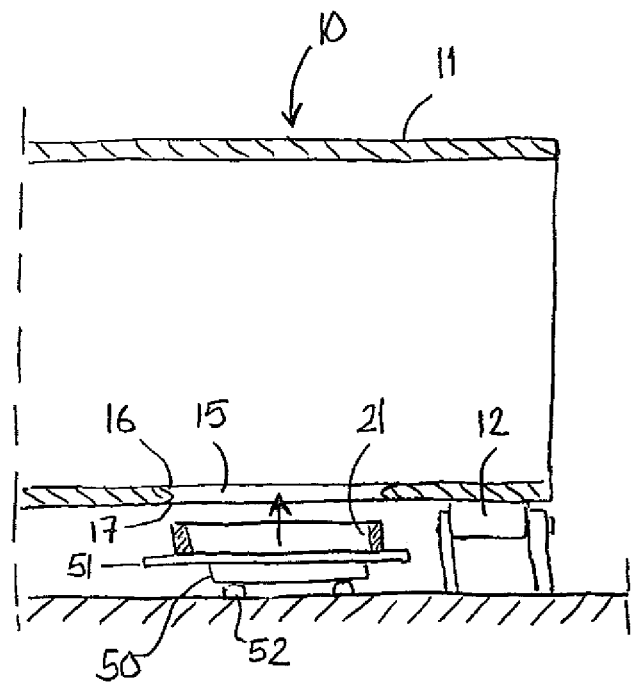

Where, in the situation shown in FIG. 9, the bevel 17 of the edge of the opening 15 has not been made on the outside, the tubular shell 11 of the tower 10 is rotated on the rollers 12 to the position shown in FIG. 10 so that the opening 15 cut in the shell 11 is on top. In this situation, a bevel 17 that opens up on the outside of the shell 11 is made on the edge of the door opening 15 cut in the tubular shell 11 of the tower 10 in the phase shown in FIG. 9 using a cutting device 41, such as a plasma torch, connected to the end of the arm 32 of the robot 30.

Where the outside bevel 17 of the edge of the opening 15 is made in the position shown in FIG. 10 from the top, the tubular shell 11 of the tower 10 is rotated further on the rollers 12 so that the opening 15 cut in the shell 11 is again in a low position in the position shown in FIG. 11.

The alternative embodiments of the invention described above show that the shape of the surface of the tubular shell 11 of the tower 10 can be measured from the inside or from the outside. As the size of the opening 15 to be made in the shell 11 can, regardless of the measuring method, also be determined from either side of the shell, the opening 15 can thereby also be made from either the inside or the outside of the shell. Further, both bevels 16 and 17 or just one of them can be made in one operation and from the same side as the opening 15, or, once the opening 15 has been made, the tubular shell 11 of the tower 10 is rotated into a suitable position for making the bevels 16 and 17 or either one of them.

When the opening 15 and the bevels 16 and 17 have been made in the shell 11 of the windmill tower 10, the door frame 21 for the shell 11 is moved, using the work platform 51 of a scissor lift 50 moving on a track 52 perpendicular to the longitudinal axis of the windmill tower 10, under the shell 11 and lifted into its place in the opening 15 using the platform 51 of the scissor lift 50. According to an alternative embodiment of the invention, the door frame 21 can also be lifted with the lift on top of the shell 11 of the tower 10 and put in its place in the opening 15 while the shell 11 is turned so that the opening 15 is located on top of the shell 11.

As described above, the bevels 16 and 17 of the edge of the opening 15 of the shell 11 can be made in one operation while the shell 11 is in the position shown in FIG. 9 or so that the outside bevel 17 is made by rotating the opening 15 into the top position shown in FIG. 10. The method to be used is selected according to the situation. The outside bevel 17 is easier to make when the shell 11 is rotated, but keeping the shell 11 in place makes it possible to avoid any potential deformations, even minor ones, of the shell 11 due to rotation.

Figure 12:
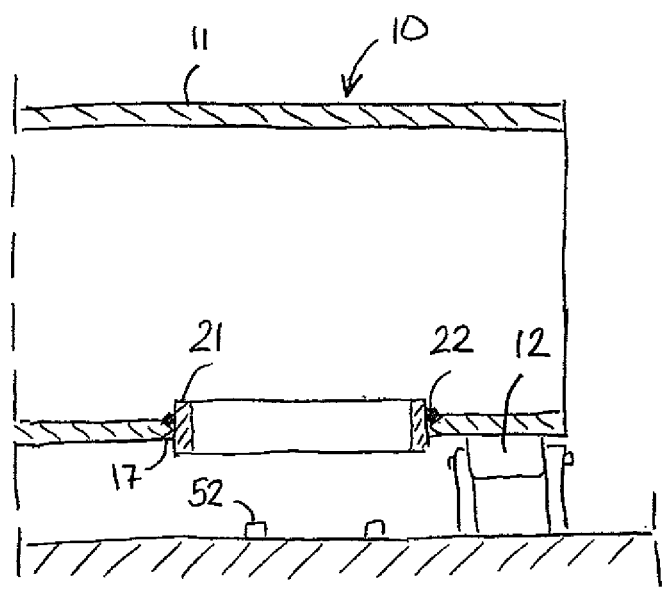

In FIG. 12, the door frame 21 has been lifted into the opening 15 of the shell 11 and tack welded in its place with tack welds 22 which are performed manually. After that, the measuring sensor 40 connected to the end of the arm 32 of the robot 30 measures, with a 3D measuring sensor 40, the actual groove geometry along the entire joint from the inside of the shell 11 of the tower 10. Based on the measurement data, the computer application calculates welding paths for the robot 30. The welding parameters and the cutting torch angles used during cutting have been adjusted to each spot of the groove separately. The length of the fusion face changes because the weld height is larger on the side of the door frame 21 than at the top and bottom points of the door frame 21.

Figure 13:
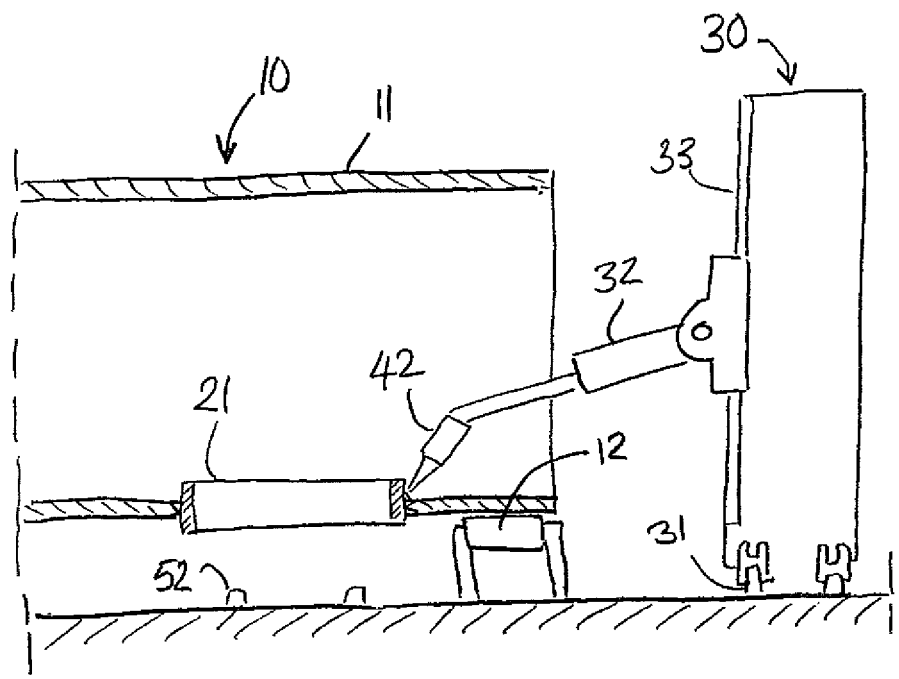

FIG. 13 shows a situation where the welding device 42 connected to the end of the arm 32 of the robot 30 welds the sealing run from the inside of the tubular shell 11 of the tower 10 by utilising the welding power sources' pulse shapes and welding parameters optimised for this application to achieve a flawless weld root. A measuring sensor 40 can also be simultaneously connected to the end of the arm 32 of the robot 30, in which case the measurement data from the 3D sensor is utilised for the real-time monitoring and control of the welding process. During welding of the sealing run, the measuring sensor 40 connected to the end of the arm 32 of the robot 30 or the robot 30 records the actual robot path used in the welding in its own memory. The path is thus saved in the memory of the robot 30 or, with the measuring sensor 40, in the memory of the measuring system.

The welding device 42 connected to the end of the arm 32 of the robot 30 welds the fill runs using welding parameters and welding device positions calculated in the manner described above. The welding method can be, for example, MAG, tandem MAG or submerged arc welding (SAW). A previously recorded actual sealing run path and torch angles and transfers in relation to the sealing run, determined separately for the various layers, can be used to correct the calculated welding path.

Figure 14:
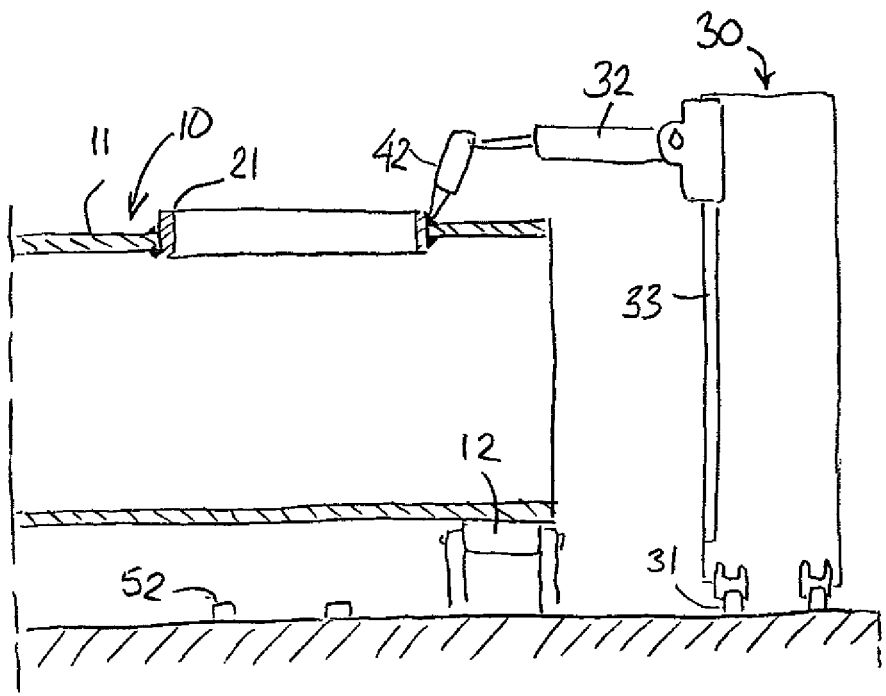

In FIG. 14, the shell 11 of the tower 10 has again been turned, using the rotating rollers, 12 so that the door frame 21 is at the highest point of the shell 11. After that, the 3D measuring sensor 40 connected to the robot 30 measures the actual position of the door frame 21 and the groove volume of the weld to be welded outside the tower 10. The computer application calculates the welding paths for the robot 30. The welding parameters and torch angles have been adjusted to each spot of the groove separately.

After that, the welding device 42 connected to the end of the arm 32 of the robot 30 welds the sealing run from outside the tubular shell 11 of the tower 10, as shown in FIG. 14. The measurement data of the 3D measuring sensor connected to the arm 32 of the robot 30 is utilised for the real-time monitoring and control of the welding process. During the welding of the sealing run, the measuring sensor 40 connected to the robot 30 records the actual robot path used in welding into its own memory.

The welding device 42 connected to the robot 30 welds the fill runs using for example MAG welding, tandem MAG welding or submerged arc welding (SAW) with the welding parameters and torch positions calculated above. The recorded actual sealing run path can be used to correct the calculated welding path. Finally, the cutting device 41, such as a plasma torch, or the welding device 42 connected to the robot 30 can perform the finishing or the weld seam edges using the TIG or plasma process by fusing the edge of the base metal and the weld metal to make it even on both the inside and outside of the tower shell 11.

Figure 15:
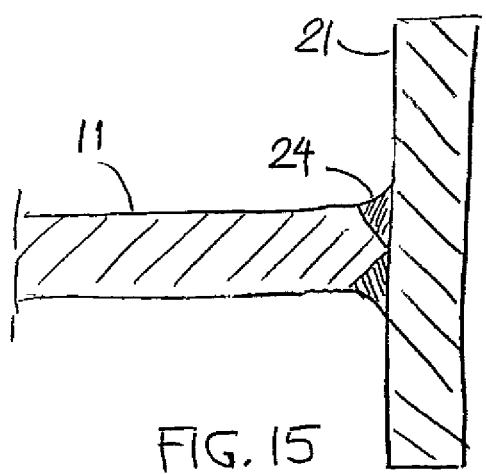

FIG. 15 shows a sectional view of the double bevel butt weld 24 that is used, according to the invention, to weld the door frame 21 on the shell 11 of the tower 10. In the double bevel butt weld 24, the weld volume is essentially smaller than in a single V groove and there is no need for back gouging as in the case of a single V groove.

Additional Notes

It is obvious to a person skilled in the art that the different embodiments of the invention may vary within the scope of the claims presented below.

LIST OF REFERENCE NUMBERS

10 Tower
11 Shell
12 Roller or Set of Rollers
15 Opening
16 Bevel on the Inside
17 Bevel on the Outside
18 Grate
20 Access Door
21 Door Frame
22 Tack Weld
23 Single V Butt Weld
24 Double Bevel Weld
30 Robot
31 Track
32 Arm
33 Guide Rail
40 Measuring Sensor
41 Cutting Device
42 Welding Device
50 Scissor Lift
51 Work Table
52 Path

The invention claimed is:

1. An automated door frame manufacturing method, according to which method an opening is made for a door in a tubular windmill tower shell made of metal sheet, and a door frame made of metal is placed in said opening and welded on the tubular windmill tower shell, comprising:
   measuring a shape of an outer circumference of the door frame for the tubular windmill tower shell and a shape of a surface of said tubular windmill tower shell at a location where the opening is to be made in the shell with a 3D measuring sensor connected to a robot to obtain measurement data,
   providing the measurement data to a computer system,
   determining (i) a cutting path in the shell for an opening (A) corresponding to the shape of the outer circumference of the door frame and (ii) a welding path between the door frame and the tubular windmill tower shell using the measurement data in the computer system, cutting the opening (A) in the tubular windmill tower shell with a cutting device controlled by the computer system, making a bevel in an edge of the opening (A) with the cutting device controlled by the computer system and, placing the door frame in the opening (A);

welding the door frame on the tubular windmill tower shell with a double bevel weld, asymmetric double V butt weld, double J weld, or square butt weld from inside and outside of said shell using the computer system to adjust the welding process along an entire joint formed between the door frame and the tubular windmill tower shell so that the joint can be filled with a constant number of welding layers, wherein the welding of the door frame on the tubular windmill tower shell comprises the steps of:

measuring actual groove geometry along an entire joint formed between the door frame and the opening (A) in the tubular windmill tower shell with the 3D measuring sensor connected to the robot to obtain measurement data, providing the measurement data to the computer system, calculating a welding path using the computer system, welding a sealing run using a welding device connected to the robot and the measuring 3D sensor, utilising the measurement data from the 3D measuring sensor for real-time monitoring and control of the welding process, recording welding device positions of an actual robot path during welding of the sealing run in a memory of a measuring system using the 3D measuring sensor, and welding fill runs using the welding device and welding parameters and recorded welding device positions.

2. The automated door frame manufacturing method according to claim 1, further comprising:

optionally correcting the calculated welding path using the recorded welding device positions of the actual robot path.

* * * * *